United States Patent
Viswanath et al.

(10) Patent No.: US 6,493,223 B1
(45) Date of Patent: Dec. 10, 2002

(54) COMPUTER UTILIZING REFRIGERATION FOR COOLING

(75) Inventors: Ram S. Viswanath; Hong Xie; Robert Sankman, all of Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/606,840

(22) Filed: Jun. 28, 2000

(51) Int. Cl.[7] ................................................. H05K 7/20
(52) U.S. Cl. ........................ 361/690; 361/683; 361/687; 165/104.33; 62/259.1
(58) Field of Search .................................. 361/683, 687, 361/692, 695, 688, 697, 700–710, 714–716, 785, 788, 690; 257/713, 718; 165/106.33, 106.36, 106.21, 80.3, 80.6, 104.33; 174/15.2, 16.3, 252; 62/259.1, 259.2, 263, 440; 29/740, 741, 890.032

(56) References Cited

U.S. PATENT DOCUMENTS

| | | | | |
|---|---|---|---|---|
| 3,559,728 A | * | 2/1971 | Lyman et al. ................. 165/55 |
| 4,352,274 A | * | 10/1982 | Anderson et al. ............. 62/229 |
| 4,546,619 A | * | 10/1985 | Rohner ........................ 62/419 |
| 5,036,677 A | * | 8/1991 | Neuenfeldt et al. ......... 62/259.1 |
| 5,069,041 A | * | 12/1991 | Thielman et al. ............. 62/263 |
| 5,331,510 A | * | 7/1994 | Ouchi et al. ................. 361/702 |
| 5,549,155 A | * | 8/1996 | Meyer et al. .......... 165/104.33 |
| 5,657,641 A | * | 8/1997 | Cunningham et al. ........ 62/263 |
| 5,706,668 A | * | 1/1998 | Hilpert ....................... 62/259.2 |
| 5,986,882 A | * | 11/1999 | Ekrot et al. ................. 361/687 |
| 6,137,682 A | * | 10/2000 | Ishimine et al. ............ 361/704 |

FOREIGN PATENT DOCUMENTS

DE          59104534 G   *   7/1991  ............ F25B/49/02

* cited by examiner

Primary Examiner—Darren Schuberg
Assistant Examiner—Michael Datskovsky
(74) Attorney, Agent, or Firm—Blakely, Sokoloff, Taylor & Zafman LLP

(57) ABSTRACT

The invention provides a computer with refrigeration. The computer has a housing, a processor, a refrigeration loop and a fan. The processor is located within the housing at a location distant from an air inlet into the housing. The refrigeration loop includes a compressor, a condenser, and expansion valve and an evaporator located in line one after the other. The evaporator is near the air inlet. The fan causes movement of air through the housing. The air passes over the evaporator to cool the air and the processor is primarily cooled by the air.

17 Claims, 2 Drawing Sheets

COMPUTER UTILIZING REFRIGERATION FOR COOLING

BACKGROUND OF THE INVENTION

1). Field of the Invention

This invention relates to a computer utilizing refrigeration for cooling.

2). Discussion of Related Art

Computers include processors, chipsets, and other components that generate large amounts of heat and for that reason have to be cooled. A heat sink is usually attached to a processor. Air is blown through a housing of the computer to cool the heat sink which includes a plurality of fins from which heat can be convected to the air.

The temperatures that are generated in personal computers are reaching levels which cannot be controlled by normal forced air convection. Larger computers such as centralized servers generate even more heat and therefore require even more cooling than personal computers.

BRIEF DESCRIPTION OF THE DRAWINGS

The invention is further described by way of examples with reference to the accompanying drawings wherein.

DETAILED DESCRIPTION OF THE INVENTION

Figure 1:
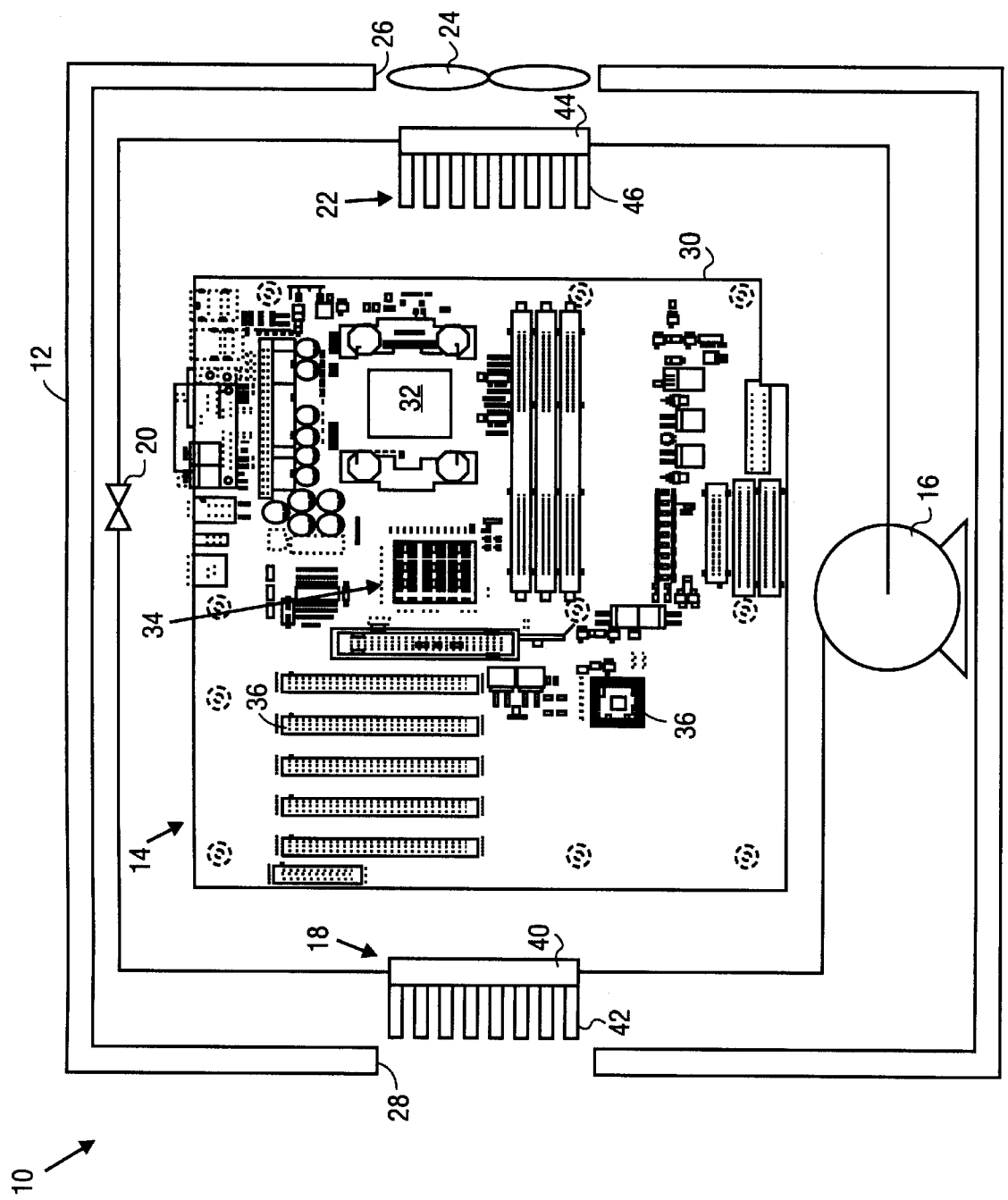
FIG. 1 is a plan view of a refrigerated personal computer according to an embodiment of the invention.

FIG. 1 of the accompanying drawings illustrates a computer 10, according to an embodiment of the invention, including a housing 12, a computer motherboard assembly 14, a compressor 16, a condenser 18, an expansion valve 20, an evaporator 22, and a fan 24.

The housing 12 has an air inlet 26 and an air outlet 28 on opposing sides thereof. The housing 12 defines an enclosure apart from the air inlet 26 and the air outlet 28.

The motherboard assembly 14 includes a computer motherboard 30, a processor 32, chipsets 34, and other components 36. The processor 32, chipsets 34, and components 36 are mounted to the computer motherboard 30. The computer motherboard 30 is secured to the housing 12 in a position wherein the processor 32, chipsets 34, and components 36 are remote from the air inlet 26.

The compressor 16, condenser 18, expansion valve 20, and evaporator 22 form a refrigeration loop wherein a fluid can flow from the compressor 16 to the condenser 18, from the condenser 18 to the expansion valve 20, from the expansion valve 20 to the evaporator 22, and from the evaporator 22 back to the compressor 16. The condenser 18 is located in a mouth of the air outlet 28 and the evaporator 22 is located near a mouth of the air inlet 26. The condenser 18 includes a base plate 40 through which the fluid can flow, and a plurality of fins 42 attached to and extending from the base plate 40. Similarly, the evaporator 22 includes a base plate 44 through which the fluid can flow, and a plurality of fins 46 extending from the base plate 44.

Operation of the computer 10 results in heating of the processor, chipsets, and components 36. The compressor 16 compresses the fluid, thereby liquefying and causing, increase in temperature of the fluid. The fluid, at the higher temperature, then flows through the condenser 18. Heat is transferred from the fluid to the base plate 40, and from the base plate 40 to the fins 42, and then convected away from the condenser 18, thus also cooling the fluid. The fluid, at the reduced temperature, then flows through the expansion valve 20. The expansion valve 20 reduces the pressure of the fluid. A reduction in pressure of the fluid expands the fluid to a gas and reduces its temperature. The temperature of the fluid is typically reduced to about −10° C., about 30° C. below the temperature of air around the computer 10. The low temperature fluid then flows through the evaporator 22 back to the compressor 16. Heat can be transferred from air to the fins 46, from the fins 46 to the base plate 44, and from the base plate 44 to the fluid. Other aspects of refrigeration cycles are known in the art.

The fan 24 is mounted to the housing 12 within a mouth of the air inlet 26. The fan 24 draws air through the air inlet 26 into the housing 12. The air flows from within the housing 12 through the air outlet 28. While moving through the housing 12, the air first flows over the fins 46 of the evaporator 22. Transfer of heat from the air to the evaporator 22 causes a reduction in temperature of the air to about 0° C. The air within the housing 12 is therefore at about 0° C. Heat is transferred from the processor 32, the chipsets 34, and components 36 to the air at 0° C. Substantially all cooling of the processor 32, chipsets 34, and components 36 is by way of convection to the air within the housing 12. The air flows from within the housing 12 over the fins 42 which causes a transfer of heat to the condenser 18 to the air, whereafter the air leaves the housing 12 through the air outlet 28.

More heat can be removed from the processors 32, the chipsets 34, and components 36 when utilizing the refrigeration loop than without the refrigeration loop because the temperature within the housing 12 is lower when the refrigeration loop is used. It should be noted that the processor 32 can be removed without removing any one of the components of the refrigeration loop. The processor 32 can thus be replaced without affecting the components of the refrigeration loop. As such, the embodiment of the computer 10 finds particular application in for example a desktop personal computer where it may be desirable to replace individual components without affecting others.

Figure 2:
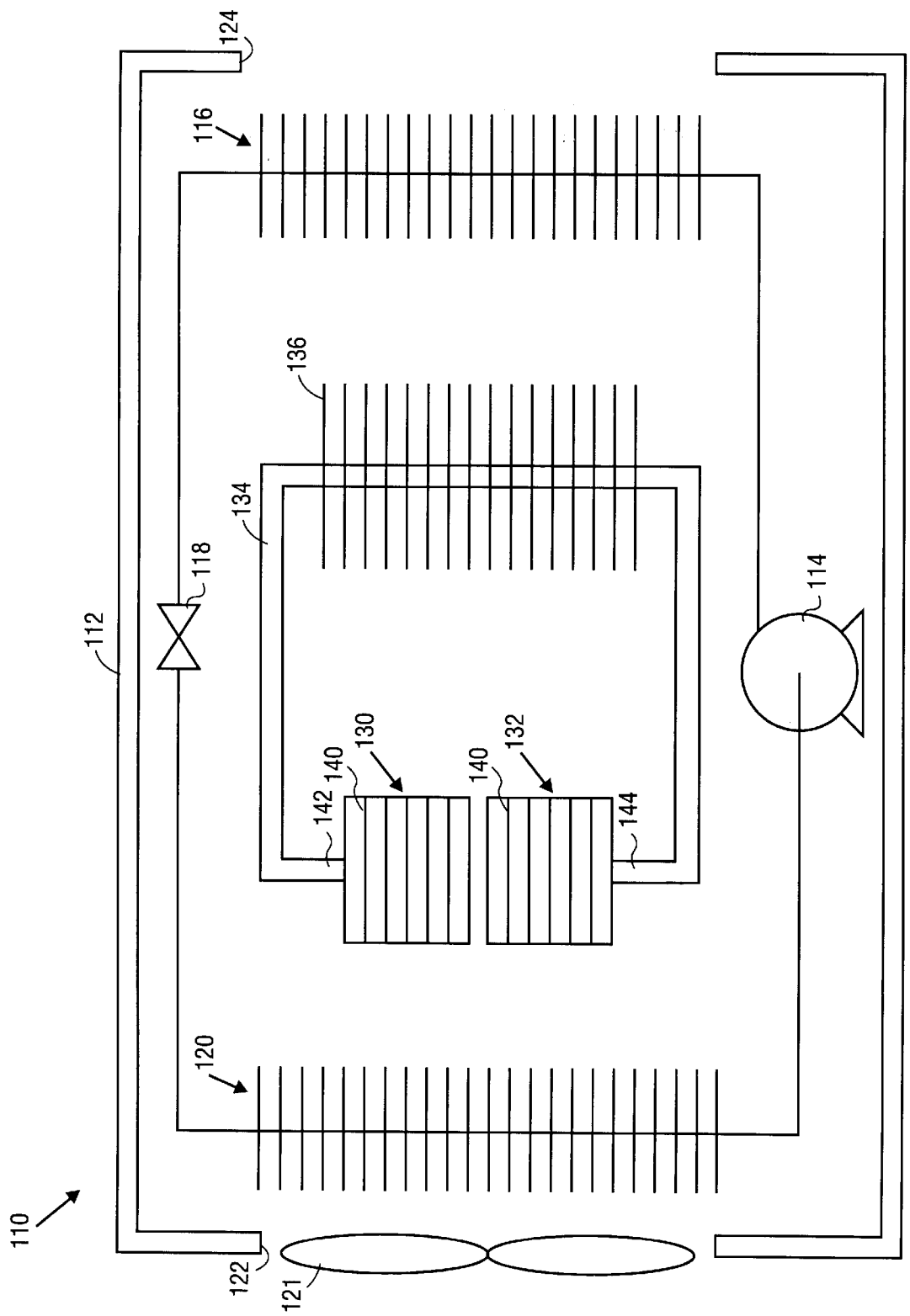
FIG. 2 is a plan view of a refrigerated server computer according to another embodiment of the invention.

FIG. 2 illustrates a computer 110 which may find particular application 45 a server computer. As with the embodiment of FIG. 1, the computer 110 has a housing 112, a compressor 114, a condenser 116, an expansion valve 118, and an evaporator 120. A fan 121 is mounted to the housing 112 within a mouth of an air inlet 122 into the housing 112. An air outlet 124 is formed out of an opposing side of the housing 112. Air entering the housing through the air inlet 112 is cooled by the evaporator 120 and air leaving the housing 112 is heated by the condenser 116 as it leaves the housing 112 through the air outlet 124.

In addition to a refrigeration loop provided by the air compressor 114, the condenser 116, the expansion valve 118, and the evaporator 120, the computer 110 also includes a heat pipe loop formed by first and second heat sinks, 130 and 132 respectively, a heat pipe 134, and fins 136. Each one of the heat sinks 130 or 132 has a base plate attached to a respective processor (not shown), and a plurality of fins 140 extending form the base plate. The heat pipe 134 has first and second opposing ends 142 and 144 respectively. The first end 142 is connected to the first heat sink 130 and the second end 142 is connected to the second heat sink 132. A cooling medium can flow between the first heat sink 130 and the heat pipe 134, and between the second heat sink 132 and the heat pipe 134. The heat sinks 130 and 132 are in flow communication through the heat pipe 134.

The fins 136 are located on a section of the heat pipe 134 between the first and second ends 142 and 144. The heat sinks 130 and 132 are located on one side of the fins 136 and the condenser 116 is located on an opposing side of the fins 136.

In use, the processors connected to the heat sinks 130 and 132 generate heat. Heat is transferred from a respective processor to a respective one of the heat sinks 130 or 132. The heat transferred to the first heat sink 130 causes heating and evaporation of a cooling medium in the first end 142 within the heat pipe 134. Similarly, heat transferred to the second heat sink 132 causes evaporation of a cooling medium in the second end 144 of the heat pipe 134. The evaporated cooling medium flows from the first end 142 to the section of the heat pipe 134 with the fins 136 thereon, and from the second end 142 through the heat pipe 134 to the section of the heat pipe 134 with the fins 136 thereon. Heat can be transferred from the cooling medium to the fins 136, causing condensation thereof. The cooling medium then flows through a wicking system back to the heat sinks 130 and 132.

Air entering the housing 112 through the air inlet 122 first flows over fins of the evaporator 120, causing cooling of the air. The air then flows over the heat sinks 130 and 132, causing a transfer of heat from the heat sinks 130 and 132 to the air. The heat sinks 130 and 132 are thereby cooled and the air is heated. The air then flows over the fins 136, causing a transfer of heat from the fins 136 to the air. The fins 136 are cooled by the air and the air is further heated. Air then flows over fins of the condenser 116, causing further heating of the air before it leaves the housing 112 through the air outlet 124.

EXAMPLE

As an example, in a steady-state condition the fluid flowing through the refrigeration loop is at 120° C. after leaving the compressor 114, 110° C. after leaving the condenser 116, at −10° C. after leaving the expansion valve 118, and at −5° C. after leaving the evaporator 120. The processors are at 80° C. The cooling medium is at 78° C. at the ends 142 and 144, and at 76° C. at the fins 136. Air is at 25° C. before entering the housing, at 0° C. after flowing over the evaporator 120, at 40° C. after flowing over the heat sinks 130 and 132, at 70° C. after flowing over the fins 136, and at 100° C. after flowing over the condenser 116.

An advantage of the invention is that of an integrated system wherein air is sub-cooled before flowing over the heat sinks 130 and 132. The same air is then used for cooling both a cooling medium within the heat pipe 132 and a fluid within the condenser 116. The fluid within the condenser 116 is at a much higher temperature than the processors connected to the heat sinks 130 and 132, thereby allowing for removal of more heat from within the housing 112.

The heat pipe loop also provides for equalization of power fluctuations of the two processors. Because two heat sinks are connected to two processors, power fluctuations in one of the processors can be equalized by power fluctuations in another one of the processors. The total power generated by the two processors thereby remains more stable. Because of more stability of power generated by the two processors, the temperature of the fins 136 can be maintained more stable, thereby allowing for more stable operation of the refrigeration loop.

While certain exemplary embodiments have been described and shown in the accompanying drawings, it is to be understood that such embodiments are merely illustrative and not restrictive of the current invention, and that this invention is not restricted to the specific constructions and arrangements shown and described, since modifications may occur to those ordinarily skilled in the art.

What is claimed:

1. A computer comprising:
    a housing having an air inlet and an air outlet;
    a first processor located within the housing at a location distant from the air inlet;
    a refrigeration loop secured to the housing, including a compressor, a condenser, an expansion valve and an evaporator located in line one after the other, the evaporator being at a location near the air inlet; and
    a fan secured to the housing, the fan causing movement of air into the air inlet through the housing and out of the air outlet, the air flowing over the evaporator and then flowing to the first processor, the first processor being cooled primarily by the air in the housing, and then over the condenser to cool the condenser.

2. The computer of claim 1 wherein at least 50 percent of heat transfer from the first processor transfers to the air in the housing.

3. The computer of claim 1 wherein the first processor is removable from the housing without unsecuring the evaporator from a portion of the housing.

4. The computer of claim 1 wherein operation of the refrigeration loop results in a temperature of the air in the housing which is at least 10° C. lower than ambient temperature of air around the housing.

5. The computer of claim 1 further comprising a chipset located within the housing, the chipset being cooled primarily by the air in the housing.

6. The computer of claim 1 wherein the evaporator has a plurality of fins, the air passing over the fins so that heat is transferred from the air to the fins.

7. The computer of claim 1 wherein the condenser is located near the air outlet.

8. The computer of claim 1 further comprising:
    a heat pipe loop including a first heat sink connected to the first processor, a heat pipe connected to the heat sink, and a plurality of fins connected to a portion of the heat pipe distant from the first heat sink.

9. The computer of claim 8 further comprising:
    a second processor located in the housing;
    a second heat sink connected to the second processor, a first end of the heat pipe being connected to the first heat sink, a second opposing end of the heat pipe being connected to the second heat sink, and the fins being located on a portion of the heat pipe between the first and second ends.

10. The computer of claim 8 wherein the air primarily flows sequentially over the evaporator, the heat sinks, the fins, and the condenser.

11. A computer comprising:
    a housing having an air inlet and an air outlet;
    a first processor located within the housing at a location distant from the air inlet;
    a fan secured to the housing, the fan causing movement of air into the air inlet, through the housing and out of the air outlet;
    a compressor secured to the housing, the compressor compressing a fluid, thereby causing heating of the fluid;
    a condenser secured to the housing, the condenser receiving the fluid from the compressor and cooling the fluid;

an expansion valve secured to the housing, the expansion valve receiving the fluid from the condenser and causing expansion of the fluid, thereby causing cooling of the fluid; and an evaporator secured to the housing, the evaporator receiving the fluid from the expansion valve whereafter the fluid flows to the compressor, the evaporator being located in a path of the air so that the air flows over the evaporator causing transfer of heat from the air to the evaporator and cooling of the air, whereafter the air cools the first processor, cooling of the first processor primarily being due to transfer of heat from the first processor to the air, the condenser being located in a path of the air so that the air flows over the condenser after cooling the first processor.

12. The computer of claim 11 wherein the condenser is primarily cooled by the air.

13. The computer of claim 12 wherein the condenser is located near the air outlet.

14. The computer of claim 11 wherein the evaporator has a plurality of fins, the air passing over the fins so that heat is transferred from the air to the fins.

15. A computer comprising:

a housing having an air inlet and an air outlet;

a first processor located in the housing;

a heat pipe loop secured to the housing, including a first heat sink connected to the first processor, a heat pipe connected to the first heat sink and a plurality of fins connected to the heat pipe at a location distant from the first heat sink;

a refrigeration loop secured to the housing, including a compressor, a condenser, and expansion valve, and an evaporator located sequentially after one another; and a fan causing movement of air into the air inlet, through the housing and out of the air outlet, the air flowing first over the evaporator causing cooling of the air, then over the first heat sink causing heating of the air, then over the fins causing further heating of the air and then over the condenser causing further heating of the air.

16. The computer of claim 15 further comprising:

a second processor located in the housing; and a second heat sink connected to the second processor, a first end of the heat pipe being connected to the first heat sink, a second opposing end of the heat pipe being connected to the second heat sink, and the fins being located on a portion of the heat pipe between the first and second ends.

17. The computer of claim 16 wherein the air flows sequentially over the evaporator, then over the second heat sink, and then over the fins.

\* \* \* \* \*